(12) United States Patent
Park

(10) Patent No.: US 8,130,417 B2
(45) Date of Patent: Mar. 6, 2012

(54) IMAGE PROCESSING APPARATUS AND IMAGE PROCESSING METHOD

(75) Inventor: Kyoung-sik Park, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 600 days.

(21) Appl. No.: 12/049,498

(22) Filed: Mar. 17, 2008

(65) Prior Publication Data

US 2008/0309982 A1 Dec. 18, 2008

(30) Foreign Application Priority Data

Jun. 14, 2007 (KR) .................... 10-2007-0058350
Feb. 20, 2008 (KR) .................... 10-2008-0015507

(51) Int. Cl.
*H04N 1/40* (2006.01)
(52) U.S. Cl. ...................... 358/3.26; 382/289

(58) Field of Classification Search ............. 358/1.9, 358/2.1, 3.26, 1.18, 468; 382/76, 289–290, 382/296–298
See application file for complete search history.

(56) References Cited

U.S. PATENT DOCUMENTS

| | | | | |
|---|---|---|---|---|
| 4,107,741 A | * | 8/1978 | Lemelson | 358/300 |
| 4,447,832 A | * | 5/1984 | Kurata et al. | 358/451 |
| 4,543,611 A | * | 9/1985 | Kurahayashi | 358/410 |
| 4,972,209 A | * | 11/1990 | Tanigawa | 347/252 |
| 5,428,459 A | * | 6/1995 | Asai | 358/449 |
| 6,323,957 B1 | * | 11/2001 | Ball | 358/1.9 |
| 6,407,824 B1 | * | 6/2002 | Hashimoto | 358/1.9 |
| 2007/0101292 A1 | * | 5/2007 | Kupka | 715/810 |
| 2009/0015887 A1 | * | 1/2009 | Ohk | 358/488 |
| 2009/0034853 A1 | * | 2/2009 | Miyazawa et al. | 382/233 |

* cited by examiner

*Primary Examiner* — Thomas D Lee
*Assistant Examiner* — Stephen M Brinich
(74) *Attorney, Agent, or Firm* — Stanzione & Kim, LLP

(57) ABSTRACT

An image processing apparatus includes an inputting unit to receive image data having pixel data, an image processing unit to align and output the pixel data, and a control unit to prevent the pixel data from being transmitted to the image processing unit when the pixel data have null data.

15 Claims, 3 Drawing Sheets

IMAGE PROCESSING APPARATUS AND IMAGE PROCESSING METHOD

CROSS-REFERENCE TO RELATED APPLICATIONS

This application claims priorities from Korean Patent Applications No. 10-2007-0058350, filed on Jun. 14, 2007 and No. 10-2008-0015507, filed on Feb. 20, 2008 in the Korean Intellectual Property Office, the disclosures of which are hereby incorporated in their entirety by reference.

BACKGROUND OF THE INVENTION

1. Field of the Invention

The present general inventive concept relates to an image processing apparatus and image processing method, and more particularly, to an image processing apparatus and image processing method which can selectively perform a data correction process to improve the image quality and processing speed of color image data.

2. Description of the Related Art

A conventional image processing apparatus such as a color laser printer typically performs a binary trapping process to correct mis-registration of received image data to improve image quality when the pixel position of the received image data deviates from respective color channels.

In these conventional image processing systems, when the binary trapping process is performed on binary data through a half-tone process, the data processing is performed for every pixel of the received image data, including white pixel data (i.e. null data) which does not contain any color information. In other words, the binary trapping process is performed on all the received image data, including the null data that does not contain any color information.

As a result, the overall data processing speed for pixel data consisting mainly of white pixel data (i.e. null data without color information) is substantially the same as the processing speed for pixel data consisting mainly of color pixel data.

SUMMARY OF THE INVENTION

The present general inventive concept provides an image processing apparatus and image processing method which can improve overall processing speed when a number of null data that do not have color information are included in the image data to be printed. This may be achieved by effectively processing and correcting only the data that includes color information, and bypassing data that does not include any color information (i.e. null data).

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can also be achieved by providing an inputting unit to receive image data having pixel data, an image processing unit to align and output the pixel data, and a control unit to prevent the pixel data from being transmitted to the image processing unit when the pixel data have null data.

The control unit may determine whether the pixel data have the null data, and the image processing unit may align and output the pixel data according to the determination of the control unit.

The control unit may control the image processing unit to output the pixel data without aligning the pixel data if the received pixel data have null data, and may control the image processing unit to output the pixel data after aligning the pixel data if the received pixel data does not have null data.

The control unit may determine whether the pixel data have the null data, may control the image processing unit to output the pixel data without aligning the pixel data if the received pixel data have null data, and may control the image processing unit to output the pixel data after aligning the pixel data if the received pixel data does not have null data, according to the determination of the control unit.

The image processing apparatus may further include an output unit to output the pixel data, wherein the control unit determines whether the pixel data have the null data, transmits the pixel data to the output unit when the pixel data has the null data, and transmits the pixel data to the image processing unit when the pixel data does not have the null data.

The control unit may not transmit the pixel data to the image processing unit when the pixel data have the null data.

The control unit may perform a logical sum operation to determine whether the pixel data contains null data.

The inputting unit may include a storing unit to store the image data by line from a page to be printed.

The image data may include a binary code that has been half-tone processed through an emulation process.

The image processing unit may include a binary trapping unit to correct mis-registration of the pixel data.

The foregoing and/or other aspects and utilities of the present general inventive concept can also be achieved by providing an image processing method including receiving an image data having pixel data that are encoded corresponding to a plurality of color channels, and outputting the pixel data of the plurality of color channels without aligning the pixel data if the received pixel data have null data or aligning the pixel data if the received pixel data does not have null data.

The receiving image data operation may include storing the received image data.

The image processing method may further include sensing whether the received pixel data have null data.

The received pixel data of the plurality of color channels may be aligned through area expansion, area reduction and/or boundary enhancement onto the pixel data of the plurality of color channels.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
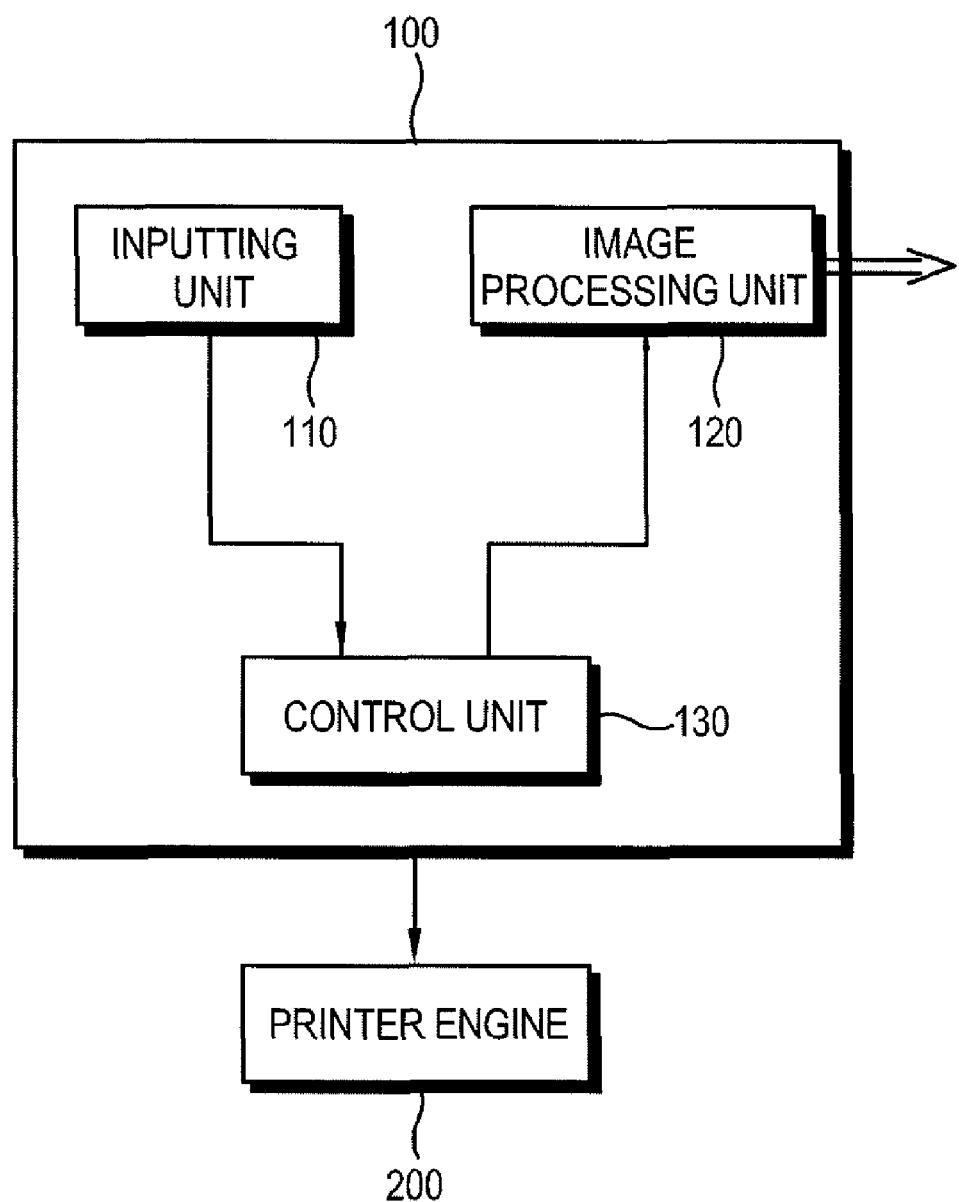
FIG. 1 is a control block diagram illustrating an image processing apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a control block diagram of an image processing apparatus 100 according to an embodiment of the present general inventive concept. RGB (Red/Green/Blue) data of a file to be printed may be transformed into CMYK (Cyan/Magenta/Yellow/Black) data through an emulation process and inputted to the inputting unit 110. The image processing unit 120 of the image processing apparatus 100 may then perform a binary trapping process to improve the image quality of the transformed image data, and then may transmit the processed data to an image forming unit (not shown).

Accordingly, as illustrated in FIG. 1, the image processing apparatus 100 may include an inputting unit 110, an image processing unit 120 and a control unit 130.

The inputting unit 110 may receive image data. In this case, the image data may be received in the form of a binary code that has been half-tone processed through an emulation process for each CMYK channel. The image data may also be received by line of a page to be printed through the inputting unit 110.

The image processing unit 120 may then process the image data to improve image quality, and may perform compression/decompression processes on the processed data to output the data to a printer engine 200. The printer engine 200 may be an image forming apparatus including a printing medium feeding unit to feed a printing medium, a printing unit to form or print an image on the fed printing medium according to the processed data, and a discharge unit to discharge the printing medium.

In accordance with an embodiment of the present general inventive concept, the image processing unit 120 may include a binary trapping core unit which performs a binary trapping process to correct mis-registration if the received binary data deviates from positions in which they are supposed to be printed as indicated by the respective channels of each pixel. The image processing unit 120 may further include an outputting unit 122 to output the processed image data to an output device, such as another image processing apparatus or the printer engine 200, through an outer bus.

The binary trapping core unit of the correcting unit 121 can solve image distortion phenomenon between colors through area expansion, area reduction, boundary enhancement and/or other techniques known in the art to correct the mis-registration typically caused by blank areas of different color regions or blurring phenomenon at a text boundary part in graphic areas and text areas among the four (4) respective channels for each pixel.

As described in more detail below, the control unit 130 may check whether pixel data of the received image data are null data; that is, whether the image data includes color information or not. In accordance with an embodiment of the present general inventive concept, if the control unit 130 determines that the pixel data of the received image data contains mainly null data, the control unit 130 may control the received image data so that the null data does not to go through the binary trapping core unit. Instead, the control unit 130 may transfer the null data directly to the outputting unit 122. In this way, the null data bypasses the binary trapping core unit of the correcting unit 121 and is outputted without trapping, thus improving the overall processing speed of the received image data. The null data may be white pixel data that does not contain color information.

On the other hand, if the control unit 130 determines that the pixel data of the received image data contains color information (i.e. not null data), the control unit 130 may transfer the received color image data to the binary trapping core unit of the correcting unit 121 so that the image distortion can be corrected.

Figure 2:
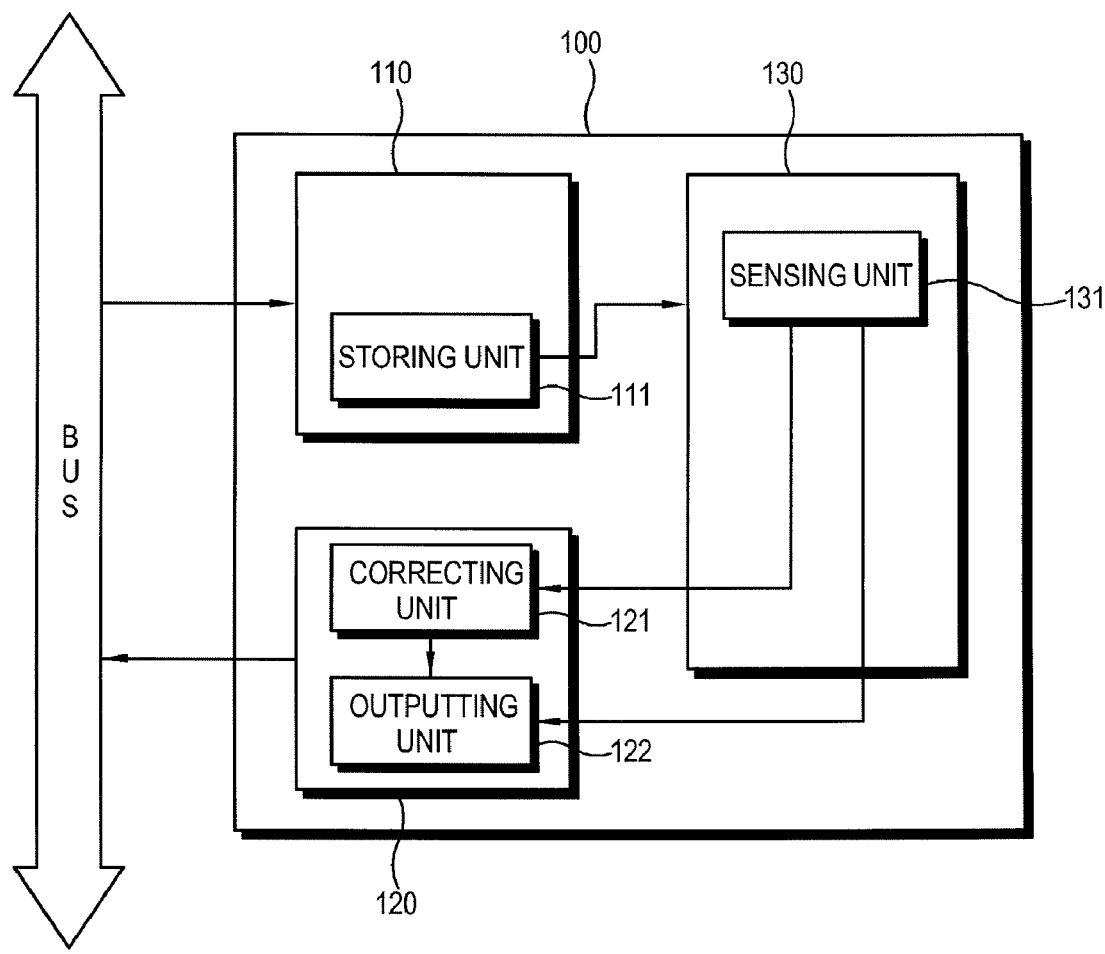
FIG. 2 is a block diagram illustrating an image processing apparatus according to an embodiment of the present general inventive concept.

FIG. 2 is a block diagram of the image processing apparatus 100 according to an embodiment of the present general inventive concept.

As illustrated in FIG. 2, after the image data have been transformed into CMYK binary data through an emulator process (not shown), the binary data may be inputted to the inputting unit 110 in the order the binary data is received.

According to an embodiment of the present general inventive concept, the received image data may be received by line from a page to be printed and stored in a storing unit 111. For example, if the binary trapping core unit uses a 5*5 window to process the pixel data at a center portion by using its neighboring 5*5 pixel data values, the storing unit 111 may store the image data of up to 5 lines. In such a case, after the image data from the $1^{st}$ to $5^{th}$ lines are stored, the pixel data from the $1^{st}$ line may then be processed. Then, after the pixel data from the $1^{st}$ line is processed, new image data from the $6^{th}$ line of the page to be printed may be inputted, and the image data from the $2^{nd}$ to $6^{th}$ lines may then be stored in the storing unit 111.

In accordance with an embodiment of the present general inventive concept, the storing unit 111 may be configured with a size to store up to 6 lines of data, including 5 lines for correcting the pixel data and 1 line for data buffering. However, it is understood that the storing unit 111 may be configured to store more or less lines without departing from the principles and spirit of the present general inventive concept.

Once the image data is stored in the storing unit 111, the stored data may then be inputted to a sensing unit 131 to determine whether the pixel data of the inputted image data consists mainly of null data or not.

That is, as the pixel data are inputted by binary code to the control unit 130, the sensing unit 131 may determine or check whether the binary pixel data values of the inputted image data are 0 or 1, thus determining if the pixel data of the inputted image data are null data, or if they contain color information.

For example, the sensing unit 131 may perform a logical sum (OR operation) of all the binary pixel data of the inputted image data. Then, if the result of the logical sum operation is 0, the sensing unit 131 may determine that the inputted image data are null data from white pixels, and thus do not include color information. On the other hand, if the result of the logical sum operation is 1, the sensing unit 131 may determine that the inputted image data are not null data, and thus include color information. It is understood that various techniques may be implemented to determine whether some or all of the inputted image data contains mainly null data, and may be based on various approximation techniques to assess the color characteristics of the received image data, taking into account certain signal processing factors, for example bit-error rates, signal-to-noise ratios, error-floors, and other performance characteristics of the received data signals.

According to an embodiment of the present general inventive concept, the sensing unit 131 may perform a logical sum operation for the 5 lines of image data that have been stored in the storing unit 111. Then, according to the result of the logical sum operation, the sensing unit 131 may transfer the image data to a correcting unit 121 embodied by the binary trapping core unit or to an outputting unit 122 which outputs the image data to the outer bus without trapping.

In this way, if the output value is 1 according to the result of the sensing unit 131, that is, if there are pixel data having valid values which include color information, the inputted image data may be directed through the correcting unit 121 to correct image distortion before being outputted to the outer bus through the outputting unit 122. On the other hand, if the output value is 0 according to the result of the sensing unit 131, that is, if there are pixel data having valid values which do not include color information (i.e. null data), the inputted null data may be directed to the outer bus through the outputting unit 122 without going through the correction unit 121. Accordingly, overall processing speed for image data containing null data may be improved.

An image processing method according to an embodiment of the present general inventive concept will now be described with reference to FIG. 3.

Firstly, the image data to be printed may be inputted as CMYK binary data through the inputting unit 110 at S101 after the image date has gone through a binary half-tone emulation process as discussed above. For example, the image data may be inputted as binary data representing the four (4) channels according to each color of the pixel.

Next, a predetermined number of line(s) of the inputted image data may be stored in the storing unit 111 as represented at S103. According to an embodiment of the present invention, the image processing unit 120 may process the pixel data by using a 5*5 window, wherein the storing unit 111 may be configured to store up to 5 lines of the image data. However, it is understood that the storing unit 111 may be configured to store more or less lines of data without departing from the principles and spirit of the present general inventive concept.

Then, in operation S105, the sensing unit 131 determines or checks whether the 5 line data stored in the storing unit 111 consists mainly of null data. To do so, the sensing unit 131 may employ a logical sum (OR operation) gate in conjunction with known characterization techniques to determine whether the line data consists mainly of null data. If the result value of the logical sum of the pixel data in the storing unit 111 is 0, the sensing unit 131 may determine that the 5 line data consists of null data, and thus does not contain color information.

On the other hand, if the result value of the logical sum is 1, the sensing unit 131 may determine that the stored 5 line image data consists of color information and is not mainly null data.

Figure 3:
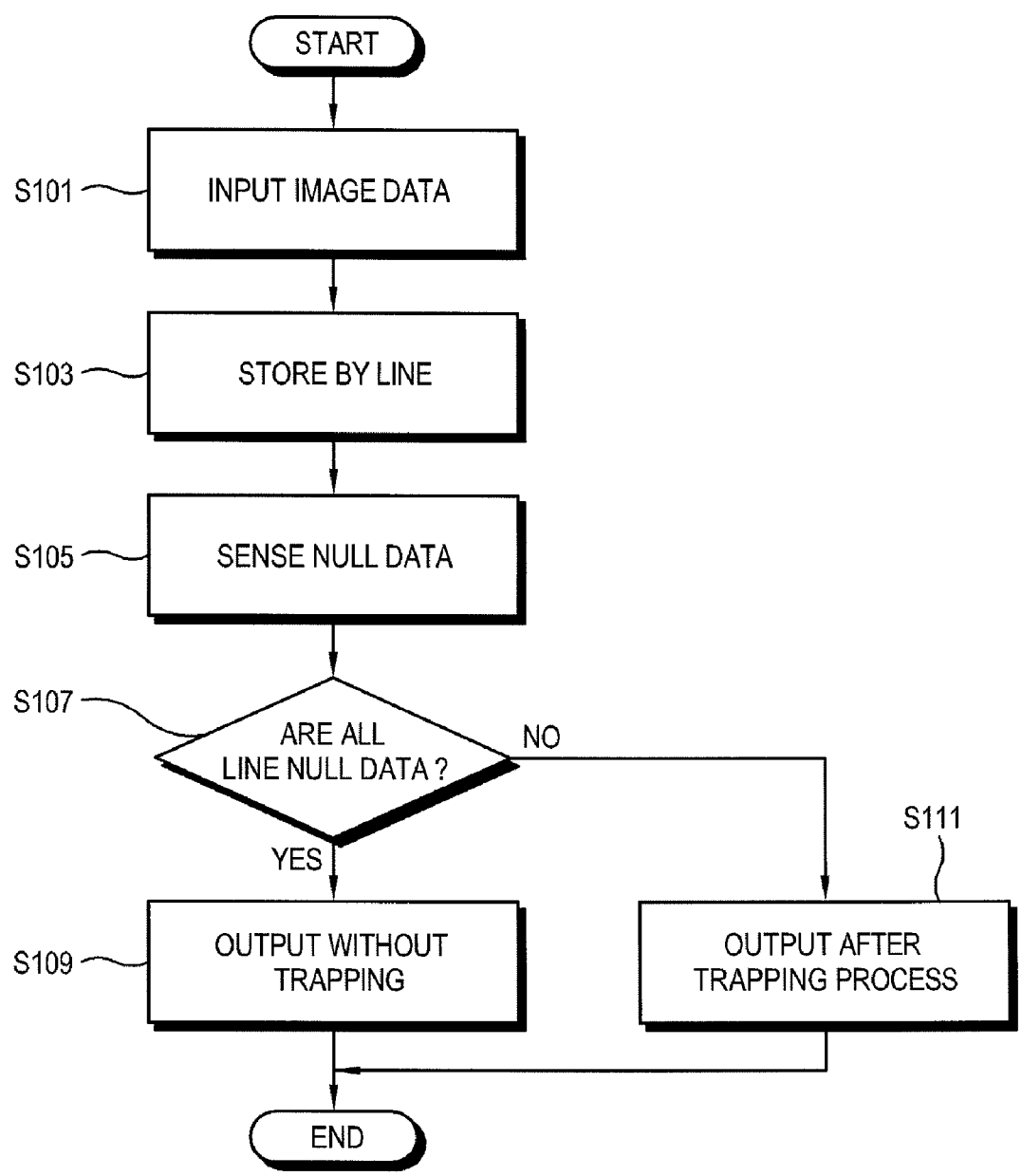
FIG. 3 is a control flow chart illustrating an image processing apparatus according to an embodiment of the present general inventive concept.

In operation S107, if the sensing unit 131 determines that the 5 line pixel data consists mainly of null data, the control unit 130 may output the stored pixel data to the outputting unit 122 so that the pixel data can be outputted to the bus without going through binary trapping process to align color data of the image data for each channel as illustrated at S109 of FIG. 3.

On the other hand if the sensing unit 131 determines that at least one of the lines of pixel data does not contain null data, the control unit 130 may control the image data to go through the image distortion correction or trapping process by the correcting unit 121. This processed data may then be outputted to the outputting unit 122 at S111.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described herein, the image processing apparatus and method of the present general inventive concept effectively processes image data containing null data in order to improve the overall processing speed of the image data. That is, if the control unit 130 determines that the received image data contains null data, the image processing apparatus and method of the present general inventive concept may be configured to bypass the image correcting unit 121 and output the null data directly to the outputting unit 122, thus improving the overall processing speed of the received image data.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing apparatus, comprising:
    an inputting unit to receive image data having pixel data;
    an image processing unit to align and output the pixel data; and
    a control unit to prevent all of the pixel data from being transmitted to the image processing unit when the pixel data have null data,
    wherein the control unit controls the image processing unit to output the pixel data without aligning the pixel data if the received pixel data have null data, and controls the image processing unit to output the pixel data after aligning the pixel data if the received pixel data does not have null data.

2. The image processing apparatus of claim 1, wherein the control unit determines whether the pixel data have the null data, and wherein the image processing unit aligns and outputs the pixel data according to the determination of the control unit.

3. The image processing apparatus of claim 1, wherein the control unit determines whether the pixel data have the null data, controls the image processing unit to output the pixel data without aligning the pixel data if the received pixel data have null data, and controls the image processing unit to output the pixel data after aligning the pixel data if the received pixel data does not have null data, according to the determination of the control unit.

4. The image processing apparatus of claim 1, further comprising:
    an output unit to output the pixel data; and
    wherein the control unit determines whether the pixel data have the null data, transmits the pixel data to the output unit when the pixel data has the null data, and transmits the pixel data to the image processing unit when the pixel data does not have the null data.

5. The image processing apparatus of claim 4, wherein the control unit does not transmit the pixel data to the image processing unit when the pixel data have the null data.

6. The image processing apparatus of claim 1, wherein the control unit performs a logical sum operation to determine whether the pixel data have the null data.

7. The image processing apparatus of claim 1, wherein the inputting unit comprises a storing unit to store the image data by line from a page to be printed.

8. The image processing apparatus of claim 1, wherein the image data comprises a binary code that has been half-tone processed through an emulation process.

9. The image processing apparatus of claim 1, wherein the image processing unit comprises a binary trapping unit to correct mis-registration of the pixel data.

10. An image processing method, comprising:
    receiving an image data having pixel data that are encoded corresponding to a plurality of color channels; and
    outputting the pixel data of the plurality of color channels without aligning the pixel data if all of the received pixel data have null data or aligning the pixel data if all of the received pixel data does not have null data,
    wherein the outputting the pixel data includes outputting the pixel data without aligning the pixel data if the received pixel data have null data, and outputting the pixel data after aligning the pixel data if the received pixel data does not have null data.

11. The image processing method of claim 10, wherein the receiving image data comprises storing the received image data.

12. The image processing method of claim 10, further comprising sensing whether the received pixel data have null data.

13. The image processing method of claim 10, wherein the received pixel data of the plurality of color channels are aligned through area expansion, area reduction and/or boundary enhancement with the pixel data of the plurality of color channels.

14. An image processing apparatus, comprising:
    an inputting unit to receive image data having pixel data;
    an image processing unit to align and output the pixel data; and
    a control unit to determine whether the pixel data have null data, and to transmit all of the pixel data that does not have null data to the image processing unit,
    wherein the control unit controls the image processing unit to output the pixel data without aligning the pixel data if the received pixel data have null data, and controls the image processing unit to output the pixel data after aligning the pixel data if the received pixel data does not have null data.

15. The image processing apparatus of claim 14, wherein the control unit prevents the transmission of all of the pixel data when the control unit determines that the pixel data has null data.

* * * * *